United States Patent [19]
Adachi et al.

[11] 3,891,350
[45] June 24, 1975

[54] IMPELLER WHEEL FOR TORQUE CONVERTER OR FLUID COUPLING AND MANUFACTURING METHOD THEREOF

[75] Inventors: Kazuma Adachi, Yao; Masayoshi Tokunaga, Takatsuki; Shigeru Takeshita, Neyagawa, all of Japan

[73] Assignee: Kabushiki Kaisha Daikin Seisakusho, Neyegawa-shi, Japan

[22] Filed: Mar. 26, 1973

[21] Appl. No.: 344,539

[30] Foreign Application Priority Data
July 5, 1972  Japan................................ 47-67827

[52] U.S. Cl. ............................................... 416/180
[51] Int. Cl. ............................................ F01d 5/04
[58] Field of Search.............. 416/180; 29/156.8 FC

[56] References Cited
UNITED STATES PATENTS

| | | | |
|---|---|---|---|
| 2,216,747 | 10/1940 | Klimek | 416/180 |
| 2,529,929 | 11/1950 | Foster | 416/180 |
| 2,556,676 | 6/1951 | Carnegie | 416/180 |
| 2,632,397 | 3/1953 | Jandasek | 416/180 |
| 2,660,957 | 12/1953 | Koskinen | 416/180 |
| 2,696,660 | 12/1954 | Misch | 29/156.8 FC |
| 2,988,006 | 6/1961 | Becker | 29/156.8 FC X |
| 3,184,833 | 5/1965 | Zeidler et al. | 29/156.8 FC |
| 3,709,635 | 1/1973 | Ivey | 416/183 |

*Primary Examiner*—Everette A. Powell, Jr.
*Attorney, Agent, or Firm*—Pierce, Scheffler & Parker

[57] ABSTRACT

The impeller wheel of the invention comprises a shell, a plurality of blades connected in one body and a core ring, each blade having a rib at its outer periphery. Each blade seats on the inner surface of the shell and is rigidly secured, at the rib, to the shell for increased durability and rigidity of the blade structure.

4 Claims, 5 Drawing Figures

3,891,350

IMPELLER WHEEL FOR TORQUE CONVERTER OR FLUID COUPLING AND MANUFACTURING METHOD THEREOF

This invention relates to an improved impeller wheel which can be used as an impeller, in a turbine, in a torque converter or fluid coupling, or similar application.

The prior art impeller wheel, such as that disclosed in U.S. Pat. No. 2,855,852, was of a type which comprised many stamped blades with pre-determined outer profiles and each blade being fixed between a shell (outer wall of working fluid path) and a core ring (inner wall). But in such prior type, since each blade had a few tabs (or projections) on its inner and outer periphery in one body, and the tabs were inserted and secured in the respective grooves or slits in the shell and core ring, the holding rigidity of the blades was low. Therefore, the higher the pressure of fluid around the blades, the more deformation, vibration and slipping off of the blades occurred.

As is known, the pressure in the casing (fluid path) of prior torque converters or liquid couplings for vehicles is 3 or 4 Kg/cm2 or below, and it is also known that higher pressure minimizes the bad effect of air or gas contained in the liquid (oil) such as cavitation, which phenomenon makes for poor performance of the device. Nevertheless, according to the above-mentioned assembled type impeller wheel, a pressure higher than above mentioned cannot be applied because of the low rigidity of the structure. Also, the performance of the prior construction gradually deteriorates, because the place and angle of the connection points between the blades and respective parts, and the curvature of the blades can easily change. The cost of manufacturing the prior type of impeller wheel is high in that it needs many parts and much labor is required for assembling the parts.

The present invention avoids the above-mentioned disadvantages. A principal object of the invention is to provide an improved impeller wheel having a shell, many blades connected in one body, and a core ring, each blade having a rib at its outer periphery (edge part) in the same body, and each blade seating on the inner surface of the shell. Each blade is secured at the rib to the shell by welding, riveting or similarly secure way, thereby increasing the rigidity and durability of the blades and of the wheel as a whole.

Another object of the invention is to provide an impeller wheel in which the distance between blades does not change as time passes, and in which the profile of the blade also does not change, because each blade is pre-connected by an annular rib or ribs and preferably being stamped in one piece from sheet metal, thereby giving high performance of the impeller wheel.

A further inventive object is to provide an impeller wheel in which each blade is connected in one piece, thereby simplifying manufacture of the blade assembly, and simplifying assembling the blades with a shell and a core ring. Additional objects include the provision of an impeller wheel of a design favorable to a lower cost of manufacture.

Also, it is an object of the invention to provide a simplified manufacturing method of the assembled-type impeller wheel. The blade is stamped in one piece, so assembling needs a minimum of labor and time.

Other objects of the invention will be apparent from the following description, taken together with the accompanying drawings in which.

Figure 1:
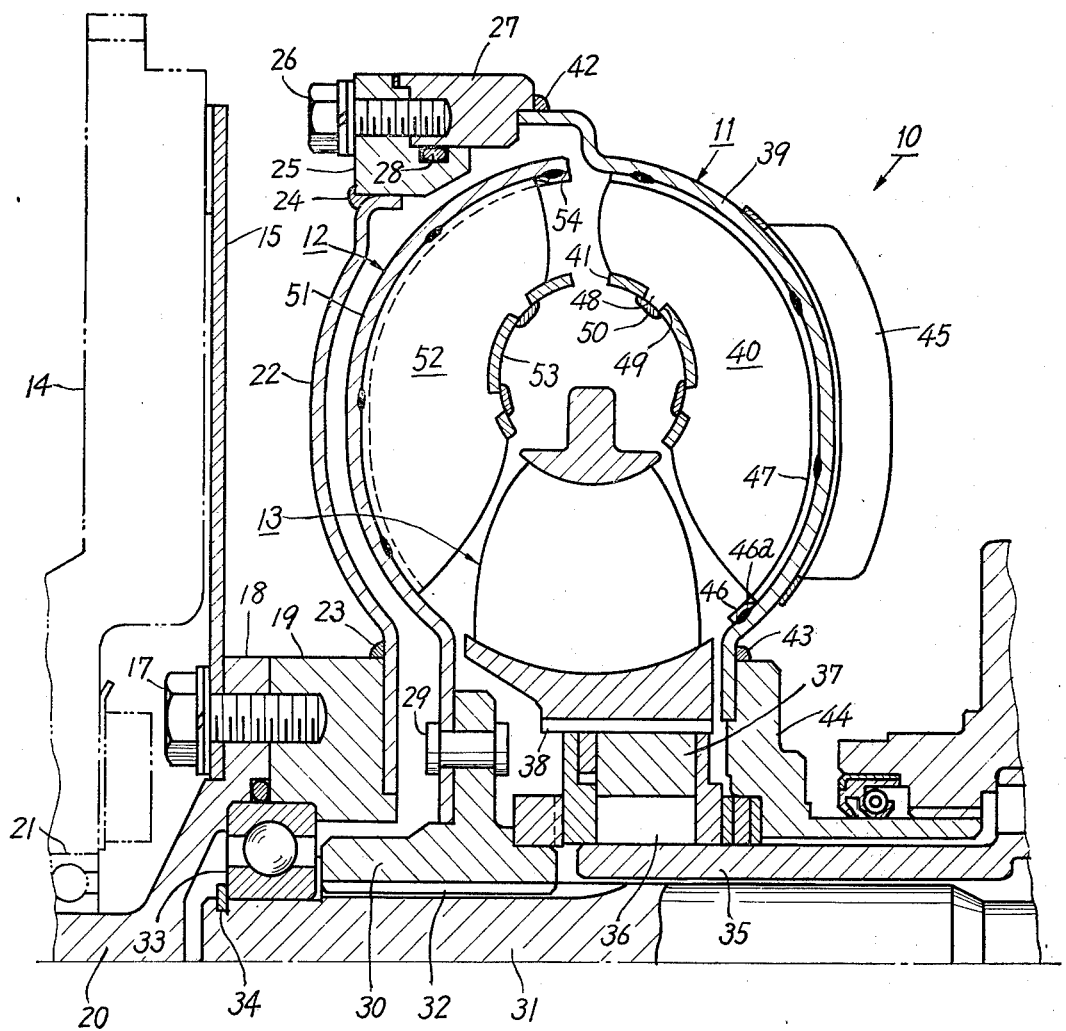
FIG. 1 is a sectional view of an upper half part of a torque converter according to the present invention.

In FIG. 1, 10 generally indicates a torque converter. Torque converter 10 comprises a drive impeller wheel, (i.e., an impeller) 11; a driven impeller wheel (i.e. a turbine) 12; and a stator 13; the impeller being adapted to transmit energy to an inner working fluid, and in turn turbine 12 receives the energy from such fluid. Stator 13 is fixed until a certain output/input speed ratio, to change the direction of the fluid to convert energy thereof.

Impeller 11 is connected to an engine flywheel indicated at 14. 15 is a drive plate with its outer periphery bolted (bolts not being shown) to flywheel 14, and its inner part secured by bolts 17 to a hub 18 and support ring 19. An axle 20 of the hub 18 is journaled in the flywheel 14 by a bearing 21. On ring 19 a drive plate 22 is welded as at 23, and a support ring 25 is also welded thereto as at 24. Around support ring 25 a support ring 27 — surrounding impeller 11 — is water tightly fastened by bolts 26 and a seal ring 28.

Turbine 12 is fixed on a spline hub 30 by means of rivets 29, and, in turn, this hub 30 engages with a spline 32 on a driven shaft (i.e. a turbine shaft) 31. Turbine shaft 31 is journaled on a bearing 33 mounted inside hub 18 and support ring 19. A ring 34 prevents the shaft 31 from slipping off axially.

Stator 13 preferably is cast in one piece, and is journaled on a fixed sleeve 35 through a one-way clutch 36. 37 designates an outer race of one-way clutch 36, and this race engages with stator 13 through a spline 38. Thus, as is well known in the art, during the accelerating process of converting torque up to a certain output/input velocity ratio, stator 13 is fixed on stationary sleeve 35, and at a velocity above said velocity ratio, the stator is allowed to rotate in the same direction as that of turbine 12 to make the converter act as a fluid coupling.

Figure 2:
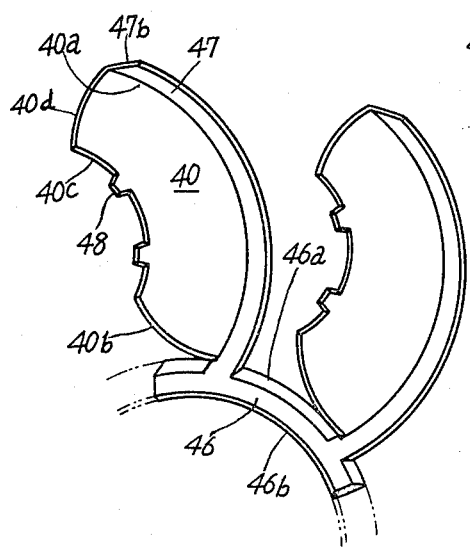
FIG. 2 is a partial birds-eye view taken from inside of the blade of an impeller (pump) embodying principles of the invention.
Figure 3:
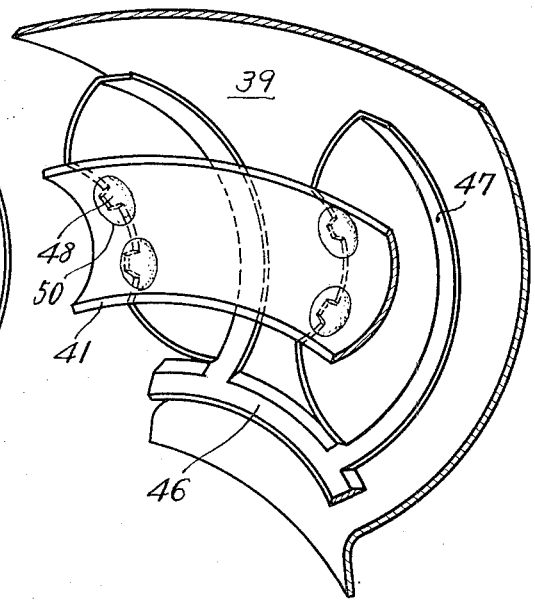
FIG. 3 is a partial birds-eye view taken from inside of the impeller wheel.

This invention is applicable to impeller 11 or to turbine 12. First, the impeller 11 comprises a shell (outer wall) 39, a rib blade 40 (a blade with a rib) secured on the inner surface of the shell, and a core ring (inner wall) 41 secured on the inner periphery (edge) of rib blade 40. The shell 39 is stamped (pressed) from a steel plate, and has a semi-toroidal inner surface: it has an annular part 42 secured by welding to the support ring 27, and a part 43 welded to an impeller hub 44, and, on the outer surface, it has a stamped cooling fan 45 welded thereon. The rib blade 40 is made of a thin steel plate by a stamping process, and has an annular rib 46 extending radially inwardly, from which annular rib radial ribs 47 extend outwardly as shown in FIG. 2. Each rib 46, 47 of rib blade 40 has a configuration complementary to that of the inner surface of shell 39 to provide a snug fit, and in this example, is (or, may be) spot-welded inside the shell 39 at four or five points on the annular rib 46 and two or three points on the radial rib 47. Also, an outer edge part 46a of annular rib 46 is tapered by a coining process to make a smooth path for the fluid. Projections (or, tabs) 48 are provided on the inner periphery of blade 40, and each projection engages in a slit 49 of the core ring 41, and is soldered on the inner surface of the core ring as at 50.

Turbine 12 has a shell 51, a rib blade 52 and a core ring 53. It has, in general, the same construction as that of impeller 11, but is distinguished by an annular rib 54 of rib blade 52, not like the annular rib 46 of the blade 40, located radially outside the rib blade. It can be said that the location of the rib 46, 54 is on the inlet side of impeller 11 respectively, turbine 12, thereby minimizing resistance to the fluid.

Blade 40 of impeller 11 in FIG. 1 is shown in FIG. 2 in detail, and its base part (i.e., a part near the shell and to which the shell is secured) 40a is rigidly supported by radial rib 47 throughout the length, as clearly shown in FIG. 2, thereby increasing its holding stiffness against the pressure of fluid. Furthermore, each blade being connected by an annular rib 46 or ribs, the circumferential position of each blade 40 (or circumferential distance between any two blades) and the posture of the blade on the inner surface of the shell are maintained constant.

Figure 4:
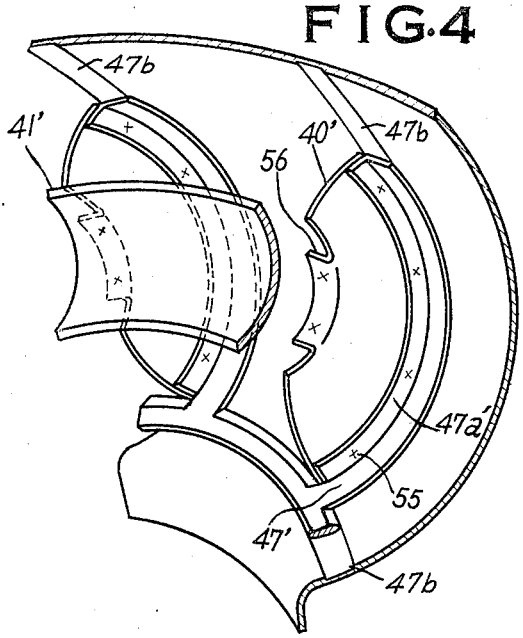
FIG. 4 is a birds-eye view of the interior of another impeller wheel according to the invention.
Figure 5:
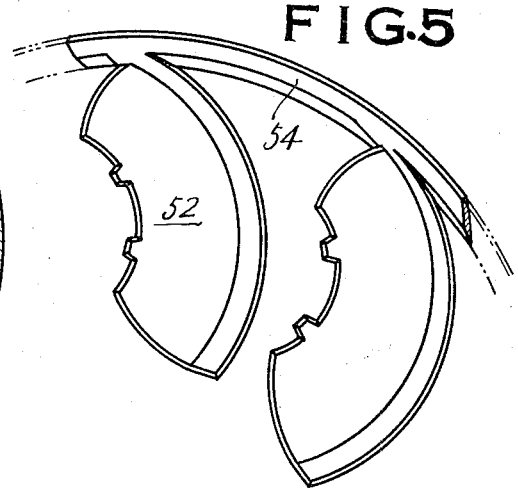
FIG. 5 is a birds-eye internal view showing a turbine blade.

Since the blades 40 shown in FIG. 2 are formed in one piece (or are stamped from a steel plate in one body), the holding rigidity of each blade 40 due to radial rib 47 is significantly enlarged. Besides, the path for working fluid is smooth. The blade assembly is easily manufactured because all blades are stamped at once. But, when there is a need to make the number or the height of the blades larger, and when, due to the same reason, it is impossible to stamp the blades 40 and annular rib 47 from one piece of sheet metal, blade 40' (FIG. 4) and rib 47' are separated and are spot-welded at points indicated as marks "$x$" (part 55) on a bent flange 47a' (i.e., axially extending flange) of rib 47'. In this case, flange 47a' holds the base part of each blade 40' along its length and acts as a supplementary blade. In FIG. 4 part 56 designates a bent piece at the inner periphery of the blade 40' on which a core ring 41' is secured.

An annular rib 46 (FIG. 1) and radial ribs 47 are preferably buried in respective recesses formed in the inner surface of the shell, as shown, for example by recess 47b, FIG. 4, to make a smooth fluid path.

The manufacturing process for the rib blade 40 shown in FIG. 2 is as follows:

1. Stamping a round plate from a thin steel sheet metal;
2. Press-forming an annular groove which fits the semi-toroidal inner surface of the shell 39;
3. Cutting edges 40b, 40c, 40d for blade 40, and, at the same time, the blade 40 is bent so as to leave the radial rib 47 remaining;
4. Cutting outer and inner periphery edges 47b, 46b; and
5. Grinding (or coining) part 46a.

For assembling blade 40 manufactured through the process aforementioned, first blade 40 is set (and held by a jig if necessary) on shell 39 (FIG. 1), spot-welded to shell 39 at several points on annular rib 46 and radial rib 47; then, core ring 41 is engaged on the projection 48 through hole 49, and part 50 is soldered. As clearly understood, since each blade 40 previously is connected by the annular rib 46, the manufacturing process is more simple, and an accurate impeller wheel 11 is obtained.

The present invention is not limited to the specific examples hereinbefore explained, and involves any embodiments within the scope of the following claims.

We claim:

1. Impeller wheel for torque converter or fluid coupling, comprising
 a shell;
 an integral array of ribbed blades attached to the inner surface of said shell;
 a core ring attached to the radially inner ends of said blades,
 each said blade having an integral radial rib extending along the entire outer periphery of said blade,
 an integral annular rib in the form of a ring-like band integral with one end of each of said radial ribs on said array of blades;
 said array of blades being connected with the inner surface of said shell by means of said radial ribs along their entire length.

2. Impeller wheel according to claim 1, in which the rib blade is a one piece stamping.

3. Impeller wheel according to claim 1, in which the base part of each blade is welded to an axial flange of a radial rib.

4. Impeller wheel according to claim 1, in which the annular rib or ribs and radial ribs are buried in respective recesses formed in the inner surface of the shell thereby providing a smooth fluid path.

* * * * *